United States Patent
Shirakawa

(10) Patent No.: US 6,307,470 B1
(45) Date of Patent: Oct. 23, 2001

(54) ANTITHEFT APPARATUS, ANTITHEFT METHOD AND RECORDING MEDIUM RECORDING THEREON ANTITHEFT PROGRAM

(75) Inventor: Takahisa Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/444,448

(22) Filed: Nov. 22, 1999

(30) Foreign Application Priority Data

Nov. 20, 1998 (JP) .................................................. 10-330365

(51) Int. Cl.⁷ .................................................. G08B 13/14
(52) U.S. Cl. ........................ 340/568.1; 340/5.85; 340/571
(58) Field of Search .................. 340/568.1, 571, 340/825.34, 825.31, 825.32, 5.8, 5.2, 5.3, 5.31, 5.85

(56) References Cited

U.S. PATENT DOCUMENTS

| | | | | |
|---|---|---|---|---|
| 4,494,114 | * | 1/1985 | Kaish | 340/825.31 |
| 5,317,304 | * | 5/1994 | Choi | 340/571 |
| 5,406,261 | * | 4/1995 | Glenn | 340/571 |
| 5,574,786 | * | 11/1996 | Dayan et al. | 380/52 X |
| 5,675,321 | * | 10/1997 | McBride | 340/568.2 |
| 5,757,270 | * | 5/1998 | Mori | 340/571 X |
| 5,757,271 | * | 5/1998 | Andrews | 340/571 X |
| 5,760,690 | * | 6/1998 | French | 340/571 |
| 6,026,492 | * | 2/2000 | Cromer et al. | 340/568.1 X |
| 6,133,830 | * | 10/2000 | D'Angelo et al. | 340/571 |

FOREIGN PATENT DOCUMENTS

| | | |
|---|---|---|
| 57-20094 | 2/1982 | (JP) . |
| 61-95037 | 6/1986 | (JP) . |
| 2-80892 | 6/1990 | (JP) . |
| 3-54054 | 5/1991 | (JP) . |
| 4-102197 | 4/1992 | (JP) . |
| 5-35354 | 2/1993 | (JP) . |
| 6-75023 | 10/1994 | (JP) . |
| 7-334264 | 12/1995 | (JP) . |
| 8-301073 | 11/1996 | (JP) . |
| 9-152990 | 6/1997 | (JP) . |
| 9-185554 | 7/1997 | (JP) . |
| 9-198576 | 7/1997 | (JP) . |

* cited by examiner

Primary Examiner—Thomas Mullen
(74) Attorney, Agent, or Firm—Young & Thompson

(57) ABSTRACT

If a determining element 101 determines, according to signals issued by sensors 20 to 2n, that a data processing apparatus 10 has been taken out, an alarm element 105 issues an alarm. A power supply password requestor 103 causes, if the determining element 101 determines at the time of turning on the power supply to the data processing apparatus 10 that the data processing apparatus 10 has been taken out, a password to be entered and, if the entered password is found illegitimate, effects control so as not to start up the data processing apparatus 10. Further, a deciphering password requester 109 causes, when a request to read out ciphered confidential information stored in a file memory 112 is entered by the user of a PC or issued from any program and if the determining element 101 determines that the data processing apparatus 10 has been taken out, a password to be entered and, if the entered password is found illegitimate, controls a file deciphering element 111 so at to refrain from deciphering the confidential information.

34 Claims, 2 Drawing Sheets

ANTITHEFT APPARATUS, ANTITHEFT METHOD AND RECORDING MEDIUM RECORDING THEREON ANTITHEFT PROGRAM

BACKGROUND OF THE INVENTION

1. Field of the Invention

The present invention relates to an antitheft apparatus, an antitheft method and a recording medium recording thereon an antitheft program for preventing personal computers (PCs) and personal digital assistants (PDAs) from being stolen.

2. Description of the Related Art

Today's compact and light PCs and PDAs are portable enough to be readily brought out of offices.

However, the memories of these PCs and PDAs may store vital confidential information for the corporation they belong to, and this implies the problem that, if a PC or a PDA storing such confidential information is illegitimately carried out of the corporate premises by an outside party, the stored confidential information may be inappropriately exploited.

In order to solve this problem, it is conceivable to have the user enter a password into the PC or PDA when turning on its power supply or when accessing a file storing confidential information.

However, it is very troublesome for the legitimate user of the PC or PDA to have to enter a password into the PC or PDA every time he or she turns on its power supply or accesses a file storing confidential information irrespective of whether the PC or PDA is used in or out of the office.

SUMMARY AND OBJECTS OF THE INVENTION

Another object of the invention is to make it possible to process authorization only when a data processing apparatus that can be readily carried out of the office is actually brought out of the office.

A first data processing apparatus according to the invention comprises a setting storage means for storing instruction information that, if the data processing apparatus is moved from its usual location, an alarm should be issued; a determining means for detecting the movement of the data processing apparatus from its usual location; and an alarming means for issuing an alarm if notified by the determining means of the movement of the data processing apparatus, if the setting storage means stores the instruction information.

A second data processing apparatus according to the invention comprises a setting storage means for storing instruction information that, at the time of turning on power supply to the data processing apparatus, a password should be entered; a determining means for detecting the movement of the data processing apparatus from its usual location; and a power supply password requesting means for requesting, if the instruction information is stored in the setting storage means at the time of turning on power supply to the data processing apparatus and the determining means has detected the movement of the data processing apparatus, the user of the data processing apparatus to enter his or her password and, if the entered password is not found identical with a prescribed password, stopping the processing to start up the data processing apparatus.

A third data processing apparatus according to the invention comprises a setting storage means for storing instruction information that a password should be entered if an access to ciphered information stored in a file storage means is requested; a determining means for detecting the movement of the data processing apparatus from its usual location; and a deciphering password requesting means for requesting, if the instruction information is stored in the setting storage means at the time of receiving an access request as stated above and the determining means has detected the movement of the data processing apparatus, the user of the data processing apparatus to enter his or her password and, if the entered password is not found identical with a prescribed password, refraining from executing the requested access.

BRIEF DESCRIPTION OF THE DRAWINGS

The invention will be understood more fully from the detailed description given here below and from the accompanying drawings of preferred embodiments of the invention, which, however, should not be regarded as limiting the invention but are merely intended to facilitate explanation and understanding.

Here, it should be noted that like reference numerals represent like elements throughout the disclosure.

DETAILED DESCRIPTION OF THE PREFERRED EMBODIMENTS

Preferred embodiments of the present invention will be described in detail below with reference to the drawings.

A first preferred embodiment of the invention is provided with a sensor for determining whether a data processing apparatus such as a PC or PDA is used in the office which is its usual location of use or used outside the office, and only when a signal from the sensor indicates the use of the data processing apparatus outside the office, authorization of a user is processed for turning on power supply to the data processing apparatus or accessing a file storing confidential information.

Figure 1:
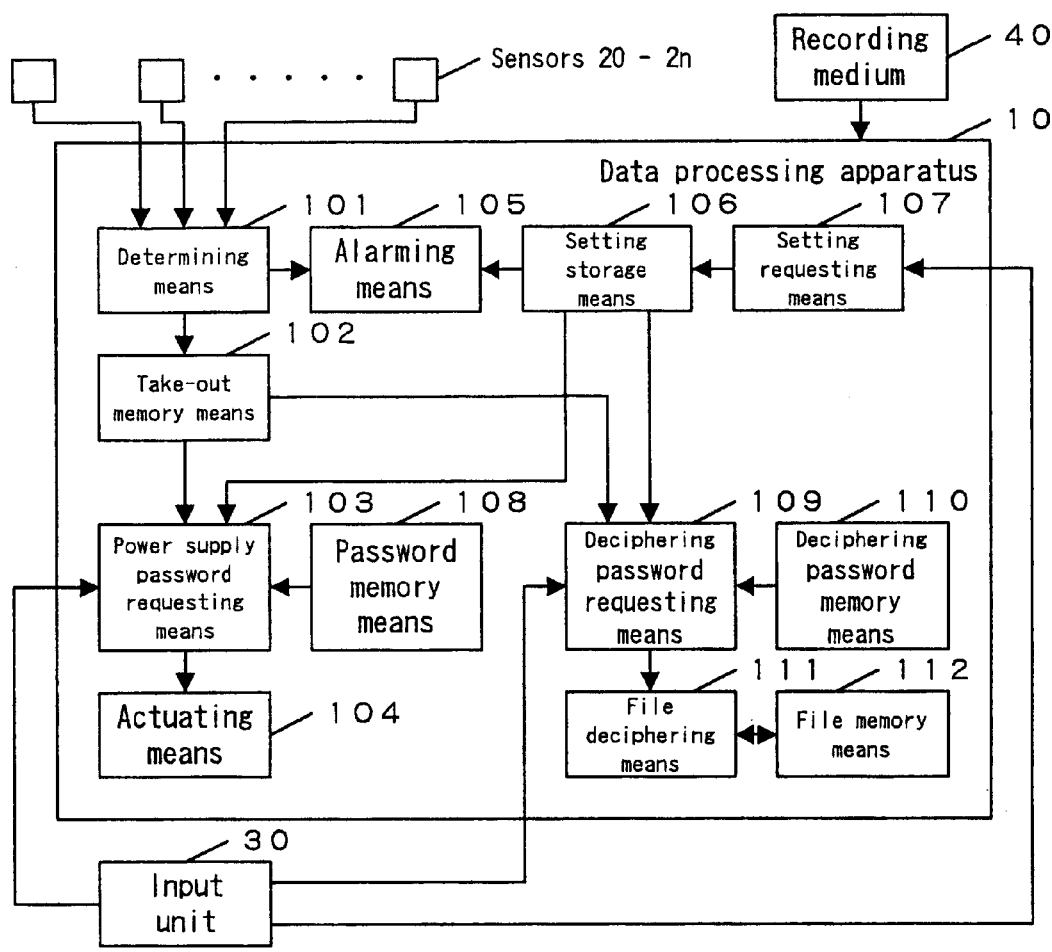
FIG. 1 is a block diagram illustrating the configuration of preferred embodiments of the invention.
Figure 2:
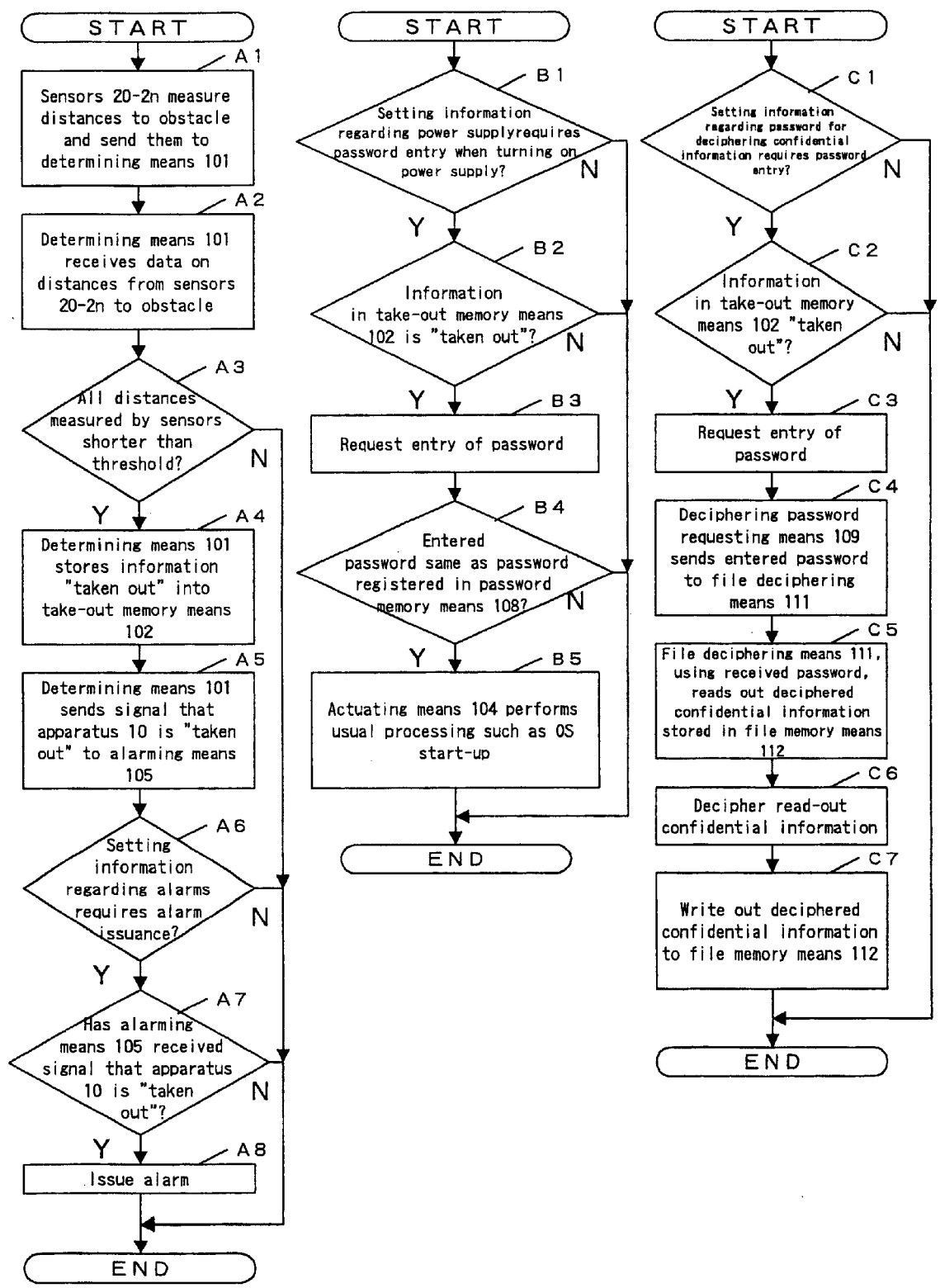
FIG. 2 is a flow chart showing how the embodiments of the invention operate.

Referring to FIG. 1, the first embodiment of the invention consists of a data processing apparatus 10 operating under programmed control, sensors 20 to 2n for detecting the state of the data processing apparatus 10 being taken out of the office, and an input unit 30, such as a keyboard, for entering a password.

The data processing apparatus 10 is provided with a determining means 101 for determining according to a signal or signals issued by any of the sensors 20 to 2n whether or not the apparatus 10 is brought out of the office; a setting storage means 106 for storing setting information to indicate whether or not an alarm is to be issued if the apparatus 10 is determined to be out of the office; and an alarming means 105 for receiving, if the determining means 101 has determined the apparatus 10 to be out of the office, from the determining means 101 a notice to that effect and issuing an alarm if the setting information stored in the setting storage means 106 indicates that an alarm is to be issued.

It is also provided with the setting storage means 106 also for storing setting information to indicate whether or not a password is to be entered at the time of turning on power supply; a take-out memory means 102 for storing the fact that the apparatus 10 is being taken out if the determining means 101 has so determined; and a power supply password requesting means 103 for requesting the user of the apparatus 10 to enter his or her password if, at the time of turning on power supply to the apparatus 10, the take-out memory means 102 stores the fact that the apparatus 10 is being taken out and the setting information stored in the setting storage means 106 requires entry of the password at the time of turning on power supply, and having an actuating means 104 suspend actuation or effect control to turn off power supply if the entered password is not identical with a password registered in a password memory means 108.

The data processing apparatus 10 is further provided with the setting storage means 106 also for storing setting information to indicate whether or not a password for deciphering ciphered confidential information is to be entered; the take-out memory means 102 for storing the fact that the apparatus 10 is being taken out if the determining means 101 has so determined; a deciphering password requesting means 109 for requesting the user of the apparatus 10 to enter his or her password if the determining means 101 stores the fact that the apparatus 10 is being taken out and the setting information stored in the setting storage means 106 requires entry of the deciphering password; and a file deciphering means 111 for reading out ciphered confidential information stored in a file memory means 112 by using the deciphering password which has been entered.

If the user of the apparatus 10 is not to be requested to enter the deciphering password, ciphered confidential information stored in the file storage means 112 is read out and deciphered by using a password stored in advance in a deciphering password memory means 110.

The sensors 20 to 2n, which are distance sensors for measuring distances by transmitting infrared rays or ultrasonic waves and receiving their reflections from obstacles, can judge whether or not the apparatus 10 is put into a box or a bag as distinguished from the movements of persons or things nearby. The determining means 101 determines the apparatus 10 to be out of the office if the distances of obstacles measured by the sensors 20 to 2n are all shorter than a prescribed threshold determined in advance.

Illuminance sensors to measure illuminance may as well be used as the sensors 20 to 2n so that the determining means 101 can judge that the apparatus 10 has been taken out of the office if variations in illuminance around the apparatus 10 as measured by the sensors 20 to 2n are uneven and all the illuminance measurements by the sensors 20 to 2n are smaller than a prescribed threshold.

Also, a single gyro sensor may be used as the sensor for this purpose so that the determining means 101 can judge that the apparatus 10 has been taken out of the office if the sensor has detected any variation in acceleration for a prescribed period.

There further can be a variation of this embodiment in which the data processing apparatus 10 is connected to a magnetic disk apparatus of a recording medium 40 such as a semiconductor memory by a signal line, and the data processing apparatus 10 executes the processing described below in accordance with a program loaded from the recording medium 40 via the signal line.

Next will be described in detail the operation of the first embodiment of the invention with reference to drawings.

Each of the sensors 20 to 2n measures the distance to an obstacle lying in its measuring direction and sends the measurement to the determining means 101 (step A1). The sensors 20 to 2n may measure the distances either constantly or at prescribed intervals of time in accordance with information from a timer (clock) provided in the data processing apparatus 10.

The determining means 101 receives data on the distance from each of the sensors 20 to 2n to an obstacle in its measuring direction (step A2), determines whether or not all the distance measured by the sensors are shorter than a predetermined value (step A3), and perceives that the apparatus 10 is being "taken out" of the office.

A setting requesting means 107 registers into the setting storage means 106 setting information entered from the input unit 30 as to:

(1) whether or not to issue an alarm,
(2) whether or not to have a password entered at the time of turning on power supply, or
(3) whether or not to have a password entered to decipher ciphered confidential information.

The alarming means 105 references the setting storage means 106; judges whether or not the setting information regarding alarms requires issuance of an alarm (step A6); if it does, further judges whether or not a signal indicating that the apparatus 10 is being "taken out" has been received from the determining means 101 (step A7); and if one has been, issues an alarm (step A8).

This alarm may be an alarm sound, human voice or the like, or consists of a specific alert packet transmitted via a LAN, either wired or wireless.

Where alarming is accomplished with an alarm sound or human voice, a password to stop alarming may be entered from the input unit 30. In that case the entered password is stored into the setting storage means 106 together with the setting information.

The power supply password requesting means 103 judges whether or not the password entered from the input unit 30 by the user of the data processing apparatus 10 is identical with a password registered in the password memory means 108 in advance (step B4) and, if it is, shifts control to the actuating means 104 to perform usual processing, such as actuation of the operating system (step B5). Or, conversely, if it is not identical, the power supply password requesting means 103 requests entry of a password again, and does not allow the usual processing until an identical password is entered. Control may be so effected here as to have actuation of the system given up or power supply turned off if the failure to enter an identical password occurs more than a prescribed number of times.

The deciphering password requesting means 109 references the setting storage means 106 if a request to read out ciphered confidential information stored in the file storage means 112 is entered by the user of the data processing apparatus 10 or issued from any program; judges whether or not the setting information regarding the password for deciphering confidential information requires entry of a password (step C1); if it does, further judges whether or not the information stored in the take-out memory means 102 indicates that the apparatus 10 is being "taken out" (step C2); and, if it does, requests entry of the password (step C3) or, if it is "not taken out", does not require entry of any password. If no password is requested, a password stored in the deciphering password memory means 110 in advance is transmitted to the file deciphering means 111.

The deciphering password requesting means 109 transmits to the file deciphering means 111 the password entered from the input unit 30 by the user of the data processing apparatus 10 (step C4).

The file deciphering means 111, using the password received from the deciphering password requesting means 109, reads ciphered confidential information stored in the file memory means 112 (step C5), deciphers it (step C6), and writes it into the file storage means 112 again (step C7).

If the received password is found wrong, the deciphering will fail, and the confidential information in the file memory means 112 will remain ciphered.

Actions of this first embodiment of the present invention will be further described below.

First it is supposed that setting information to the effect that (1) an alarm is to be issued, (2) a password is to be entered at the time of turning on power supply, and (3) a password is to be entered to decipher ciphered confidential information is stored in the setting requesting means 107 in advance.

Next will be described an action which will take place if someone tries to take out a PC by hiding into a bag from the eyes of the guard at the exit.

If a PC is contained in a bag, a box or the like, a measurement will be supplied indicating the presence of an obstacle in a position near the apparatus 10 in the measuring direction of each of the sensors 20 to 2n.

Receiving this measurement, the determining means 101 determines that the PC has been "taken out" of the office; sends a signal "taken out" to the alarming means 105, and at the same time stores information to the effect that it is "taken out" to the take-out memory means 102.

The alarming means 105, as the setting information regarding alarms stored in the setting storage means 106 requires "issuance of an alarm", issues an alarm if it receives a signal "taken out" from the determining means 101. It is thereby made possible to make the theft of a PC known to the parties concerned.

The power supply password requesting means 103, as the setting information regarding the turning-on of power supply stored in the setting memory means 106 is "having a password entered at the time turning on power supply" and information indicating that something is "taken out" is stored in the take-out memory means 102, requests entry of a password at the time of turning on power supply to the PC.

The password entered by the user of the data processing apparatus 10 from the input unit 30 is collated with a password registered in the password memory means 108 in advance, and it the two passwords are found identical, control is shifted to the actuating means 104 to perform usual processing such as starting up the operating system.

If the person who has put the PC into a bag or the like and taken out is thus found authorized to do so, he or she can use the PC normally. Of if the person is found to be an unauthorized user, the PC cannot be actuated and the security of the confidential information can be secured.

The deciphering password requesting means 109, as the setting information regarding the password for deciphering ciphered confidential information stored in setting memory means 106 requires "entry of a password for deciphering ciphered confidential information" and information indicating that something is "taken out" is stored in the take-out memory means 102, requests the user of the PC to enter a password for deciphering when a request to read out ciphered confidential information stored in the file memory means 112 is entered by the user of the data processing apparatus 10 or issued from any program.

The password entered by the user from the input unit 30 is transmitted to the file deciphering means 111.

The file deciphering means 111, using the password received from the deciphering password requesting means 109, deciphers the ciphered confidential information stored in the file storage means 112, and stores it into the file storage means 112 again.

If the person who has taken out the PC is thus found authorized to do so, deciphering of the ciphered confidential information is normally completed, and the information can be accessed in an ordinary way. Of if the person is found to be an unauthorized user, the ciphered confidential information cannot be deciphered and its security can be secured.

Next will be described the operation of the second preferred embodiment of the present invention.

The second embodiment of the invention differs from the first embodiment in that the sensors 20 to 2n are illuminance sensors instead of distance sensors.

Where illuminance sensors are used, in order to distinguish variations of illuminance due to switching-off of illumination or movements of persons or things around from what happens the apparatus 10 is put into a box or a bag when the determining means 101 is to determine whether or not the data processing apparatus 10 is being brought out of the office, it is determined that the apparatus 10 is being "taken out" if the degrees of darkening around measured by different sensors are uneven and the measurements of all the sensors are below a certain level. Description of other aspects of the configuration is dispensed with because they are the same as their respective counterparts in the first embodiment.

Next will be described the operation of the third preferred embodiment of the present invention.

The third embodiment of the invention differs from the first embodiment in that a single gyro sensor replaces the sensors 20 to 2n of the first embodiment.

Where a gyro sensor is used, in order to distinguish an earthquake or a short distance movement from what happens the apparatus 10 is taken out of the office when the determining means 101 is to determine whether or not the data processing apparatus 10 is being brought out of the office, it is determined that the apparatus 10 is being "taken out" if the variation in G is greater than a certain level. Description of other aspects of the configuration is dispensed with because they are the same as their respective counterparts in the first embodiment.

As hitherto described, the present invention makes it possible to process authorization of the user of a data processing apparatus which can be readily brought out of the office only when it is taken out of the office, and accordingly provides the advantage of preventing the data processing apparatus from being stolen or illegitimately used.

Although the invention has been described in detail above with reference to various preferred embodiments thereof, it will be appreciated by those skilled in the art that these embodiments have been provided solely for purposes of illustration, and are in no way to be regarded as limiting the invention. Instead, various modifications and substitution of equivalent techniques will be readily apparent to those skilled in the art upon reading this specification, and such modifications and substitutions are to be regarded as falling within the true scope and spirit of the following claims.

What is claimed is:

1. A data processing apparatus comprising:
   a setting storage means for storing instruction information that a password should be entered at the time of turning on power supply to said data processing apparatus;
   a determining means for detecting the movement of said data processing apparatus from its usual location; and
   a power supply password requesting means for requesting, if said instruction information is stored in said setting storage means at the time of turning on power supply to said data processing apparatus and said determining means has detected the movement of the data processing apparatus, the user of the data processing apparatus to enter his or her password and, if the entered password is not found identical with a prescribed password, stopping the processing to start up the data processing apparatus.

2. A data processing apparatus, as claimed in claim 1, wherein:

said determining means detects with a sensing device the movement of said data processing apparatus from its usual location.

3. A data processing apparatus, as claimed in claim 2, wherein:

said sensing device consists of at least one distance sensor, and the sensor or, where there is more than one, each of the sensors measures the distance between it and an obstacle located away therefrom; and said determining means determines said data processing apparatus to have been moved from the usual location thereof if the distance between each sensor and the obstacle measured by said sensing device is shorter than a prescribed threshold set in advance.

4. A data processing apparatus, as claimed in claim 2, wherein:

said sensing device consists of an illuminance sensor which measures the illuminance around it; and said determining means determines said data processing apparatus to have been moved from the usual location thereof if the illuminance measured by the sensor is smaller than a preset threshold.

5. A data processing apparatus, as claimed in claim 2, wherein:

said sensing device consists of a gyro sensor, which measures the acceleration working thereupon;

said determining means determines said data processing apparatus to have been moved from the usual location thereof if the acceleration measured by said sensing device has varied for a prescribed period.

6. A data processing apparatus comprising:

a setting storage means for storing instruction information that a password should be entered if an access to ciphered information stored in a file storage means is requested;

a determining means for detecting the movement of said data processing apparatus from its usual location; and a deciphering password requesting means for requesting, if said instruction information is stored in said setting storage means at the time of receiving said access request and said determining means has detected the movement of said data processing apparatus, the user of the data processing apparatus to enter his or her password and, if the entered password is not found identical with a prescribed password, refraining from executing said access.

7. A data processing apparatus, as claimed in claim 6, wherein:

said determining means detects with a sensing device the movement of said data processing apparatus from its usual location.

8. A data processing apparatus, as claimed in claim 7, wherein:

said sensing device consists of at least one distance sensor, and the sensor or, where there is more than one, each of the sensors measures the distance between it and an obstacle located away therefrom; and said determining means determines said data processing apparatus to have been moved from the usual location thereof if the distance between each sensor and the obstacle measured by said sensing device is shorter than a prescribed threshold set in advance.

9. A data processing apparatus, as claimed in claim 7, wherein:

said sensing device consists of an illuminance sensor which measures the illuminance around it; and said determining means determines said data processing apparatus to have been moved from the usual location thereof if the illuminance measured by the sensor is smaller than a preset threshold.

10. A data processing apparatus, as claimed in claim 7, wherein:

said sensing device consists of a gyro sensor, which measures the acceleration working thereupon;

said determining means determines said data processing apparatus to have been moved from the usual location thereof if the acceleration measured by said sensing device has varied for a prescribed period.

11. A data processing apparatus comprising:

a setting storage means for storing first instruction information that an alarm should be issued if said data processing apparatus is moved from its usual location, second instruction information that a password should be entered at the time of turning on power supply to said data processing apparatus, and third instruction information that a password should be entered if an access to ciphered information stored in a file storage means is requested;

a determining means for detecting the movement of said data processing apparatus from its usual location;

an alarming means for issuing an alarm if notified by said determining means of the movement of said data processing apparatus, if said setting storage means stores said first instruction information;

a power supply password requesting means for requesting, if said second instruction information is stored in said setting storage means at the time of turning on power supply to said data processing apparatus and said determining means has detected the movement of the data processing apparatus, the user of the data processing apparatus to enter his or her password and, if the entered password is not found identical with a prescribed password, stopping the processing to start up the data processing apparatus; and a deciphering password requesting means for requesting, if said third instruction information is stored in said setting storage means at the time of receiving said access request and said determining means has detected the movement of said data processing apparatus, the user of the data processing apparatus to enter his or her password and, if the entered password is not found identical with a prescribed password, refraining from executing said access.

12. A data processing apparatus, as claimed in claim 11, wherein:

said determining means detects with a sensing device the movement of said data processing apparatus from its usual location.

13. A data processing apparatus, as claimed in claim 12, wherein:

said sensing device consists of at least one distance sensor, and the sensor or, where there is more than one, each of the sensors measures the distance between it and an obstacle located away therefrom; and said determining means determines said data processing apparatus to have been moved from the usual location thereof if the distance between each sensor and the obstacle measured by said sensing device is shorter than a prescribed threshold set in advance.

14. A data processing apparatus, as claimed in claim 12, wherein:
    said sensing device consists of an illuminance sensor which measures the illuminance around it; and
    said determining means determines said data processing apparatus to have been moved from the usual location thereof if the illuminance measured by the sensor is smaller than a preset threshold.

15. A data processing apparatus, as claimed in claim 12, wherein:
    said sensing device consists of a gyro sensor, which measures the acceleration working thereupon;
    said determining means determines said data processing apparatus to have been moved from the usual location thereof if the acceleration measured by said sensing device has varied for a prescribed period.

16. A data processing apparatus comprising:
    a setting storage means for storing instruction information that an alarm should be issued if said data processing apparatus is moved from its usual location;
    a determining means for detecting the movement of said data processing apparatus from its usual location; and
    an alarming means for issuing an alarm if notified by said determining means of the movement of said data processing apparatus, if said setting storage means stores said instruction information;
    wherein said determining means detects with a sensing device the movement of said data processing apparatus from its usual location; and
    wherein said sensing device consists of at least one distance sensor, and the sensor or, where there is more than one, each of the sensors measures the distance between it and an obstacle located away therefrom; and
    said determining means determines said data processing apparatus to have been moved from the usual location thereof if the distance between each sensor and the obstacle measured by said sensing device is shorter than a prescribed threshold set in advance.

17. A data processing apparatus comprising;
    a setting storage means for storing instruction information that an alarm should be issued if said data processing apparatus is moved from its usual location;
    a determining means for detecting the movement of said data processing apparatus from its usual location; and
    an alarming means for issuing an alarm if notified by said determining means of the movement of said data processing apparatus, if said setting storage means stores said instruction information;
    wherein said determining means detects with a sensing device the movement of said data processing apparatus from its usual location, said sensing device consists of an illuminance sensor which measures the illuminance around it, and said determining means determines said data processing apparatus to have been moved from the usual location thereof if the illuminance measured by said sensor is smaller than a preset threshold.

18. An antitheft method comprising:
    a setting storage step to store instruction information that a password should be entered at the time of turning on power supply to a data processing apparatus;
    a determining step to detect the movement of said data processing apparatus from its usual location; and
    a power supply password requesting step to request, if said instruction information is stored at said setting storage step at the time of turning on power supply to said data processing apparatus and the movement of the data processing apparatus is detected at said determining step, the user of the data processing apparatus to enter his or her password and, if the entered password is not found identical with a prescribed password, to stop the processing to start up the data processing apparatus.

19. An antitheft method comprising:
    a setting storage step to store instruction information that a password should be entered if an access to ciphered information stored in a file storage means is requested;
    a determining step to detect the movement of said data processing apparatus from its usual location; and
    a deciphering password requesting step to request, if said instruction information is stored at said setting storage step at the time of receiving said access request and the movement of the data processing apparatus is detected at said determining step, the user of the data processing apparatus to enter his or her password and, if the entered password is not found identical with a prescribed password, to refrain from executing said access.

20. An antitheft method comprising:
    a setting storage step to store first instruction information that an alarm should be issued if a data processing apparatus is moved from its usual location, second instruction information that a password should be entered at the time of turning on power supply to said data processing apparatus, and third instruction information that a password should be entered if an access to ciphered information stored in a file storage means is requested;
    a determining step to detect the movement of said data processing apparatus from its usual location;
    an alarming step to issue an alarm if the movement of said data processing apparatus is detected at said determining step and if said first instruction information is stored at said setting storage step;
    a power supply password requesting step to request, if said second instruction information is stored at said setting storage step at the time of turning on power supply to said data processing apparatus and the movement of the data processing apparatus is detected at said determining step, the user of the data processing apparatus to enter his or her password and, if the entered password is not found identical with a prescribed password, to stop the processing to start up the data processing apparatus; and
    a deciphering password requesting step to request, if said instruction information is stored at said setting storage step at the time of receiving said access request and the movement of said data processing apparatus is detected at said determining step, the user of the data processing apparatus to enter his or her password and, if the entered password is not found identical with a prescribed password, to refrain from executing said access.

21. A recording medium recording thereon a program for causing a data processing apparatus to perform:
    setting storage processing to store instruction information that a password should be entered at the time of turning on power supply to a data processing apparatus;
    determination processing to detect the movement of said data processing apparatus from its usual location; and power supply password request processing to request, if said instruction information is stored by said setting storage processing at the time of turning on power supply to said data processing apparatus and the movement of the data processing apparatus is detected by said determination processing, the user of the data processing apparatus to enter his or her password and, if the entered password is not found identical with a prescribed password, to stop the processing to start up the data processing apparatus.

22. A recording medium recording thereon a program for causing a data processing apparatus to perform:

setting storage processing to store instruction information that a password should be entered if an access to ciphered information stored in a file storage means is requested;

determination processing to detect the movement of the data processing apparatus from its usual location; and deciphering password request processing to request, if said instruction information is stored by said setting storage processing at the time of receiving said access request and the movement of the data processing apparatus is detected by said determination processing, the user of the data processing apparatus to enter his or her password and, if the entered password is not found identical with a prescribed password, to refrain from executing said access.

23. A recording medium recording thereon a program for causing a data processing apparatus to perform:

setting storage processing to store first instruction information that an alarm should be issued if the data processing apparatus is moved from its usual location, second instruction information that a password should be entered at the time of turning on power supply to said data processing apparatus, and third instruction information that a password should be entered if an access to ciphered information stored in a file storage means is requested;

determination processing to detect the movement of said data processing apparatus from its usual location;

alarm processing to issue an alarm if the movement of said data processing apparatus is detected by said determination processing and if said first instruction information is stored by said setting storage processing;

power supply password request processing to request, if said second instruction information is stored by said setting storage processing at the time of turning on power supply to said data processing apparatus and the movement of the data processing apparatus is detected by said determination processing, the user of the data processing apparatus to enter his or her password and, if the entered password is not found identical with a prescribed password, to stop the processing to start up the data processing apparatus; and deciphering password request processing to request, if said third instruction information is stored by said setting storage processing at the time of receiving said access request and the movement of said data processing apparatus is detected by said determination processing, the user of the data processing apparatus to enter his or her password and, if the entered password is not found identical with a prescribed password, to refrain from executing said access.

24. A group of recording media, wherein a program for causing a data processing apparatus to perform predetermined steps is divided into a plurality of portions, and said portions are recorded as shared among the plurality of media, said predetermined steps comprising:

setting storage processing to store instruction information that an alarm should be issued if the data processing apparatus is moved from its usual location;

determination processing to detect the movement of said data processing apparatus from its usual location; and alarm processing to issue an alarm if the movement of said data processing apparatus is detected by said determination processing and if said instruction information is stored by said setting storage processing.

25. A group of recording media, wherein a program for causing a data processing apparatus to perform predetermined steps is divided into a plurality of portions, and said portions are recorded as shared among the plurality of media, said predetermined steps comprising:

setting storage processing to store instruction information that a password should be entered at the time of turning on power supply to a data processing apparatus;

determination processing to detect the movement of said data processing apparatus from its usual location; and power supply password request processing to request, if said instruction information is stored by said setting storage processing at the time of turning on power supply to said data processing apparatus and the movement of the data processing apparatus is detected by said determination processing, the user of the data processing apparatus to enter his or her password and, if the entered password is not found identical with a prescribed password, to stop the processing to start up the data processing apparatus.

26. A group of recording media, wherein a program for causing a data processing apparatus to perform predetermined steps is divided into a plurality of portions, and said portions are recorded as shared among the plurality of media, said predetermined steps comprising:

setting storage processing to store instruction information that a password should be entered if an access to ciphered information stored in a file storage means is requested;

determination processing to detect the movement of the data processing apparatus from its usual location; and deciphering password request processing to request, if said instruction information is stored by said setting storage processing at the time of receiving said access request and the movement of the data processing apparatus is detected by said determination processing, the user of the data processing apparatus to enter his or her password and, if the entered password is not found identical with a prescribed password, to refrain from executing said access.

27. A group of recording media, wherein a program for causing a data processing apparatus to perform predetermined steps is divided into a plurality of portions, and said portions are recorded as shared among the plurality of media, said predetermined steps comprising:

setting storage processing to store first instruction information that an alarm should be issued if the data processing apparatus is moved from its usual location, second instruction information that a password should be entered at the time of turning on power supply to said data processing apparatus, and third instruction information that a password should be entered if an access to ciphered information stored in a file storage means is requested;

determination processing to detect the movement of said data processing apparatus from its usual location;

alarm processing to issue an alarm if the movement of said data processing apparatus is detected by said determination processing and if said first instruction information is stored by said setting storage processing;

power supply password request processing to request, if said second instruction information is stored by said setting storage processing at the time of turning on power supply to said data processing apparatus and the movement of the data processing apparatus is detected by said determination processing, the user of the data processing apparatus to enter his or her password and, if the entered password is not found identical with a prescribed password, to stop the processing to start up the data processing apparatus; and deciphering password request processing to request, if said third instruction information is stored by said setting storage processing at the time of receiving said access request and the movement of said data processing apparatus is detected by said determination processing, the user of the data processing apparatus to enter his or her password and, if the entered password is not found identical with a prescribed password, to refrain from executing said access.

28. A program embodied in electric signals, said program causing a data processing apparatus to perform:

setting storage processing to store instruction information that a password should be entered at the time of turning on power supply to a data processing apparatus;

determination processing to detect the movement of said data processing apparatus from its usual location; and power supply password request processing to request, if said instruction information is stored by said setting storage processing at the time of turning on power supply to said data processing apparatus and the movement of the data processing apparatus is detected by said determination processing, the user of the data processing apparatus to enter his or her password and, if the entered password is not found identical with a prescribed password, to stop the processing to start up the data processing apparatus.

29. A program embodied in electric signals, said program causing a data processing apparatus to perform:

setting storage processing to store instruction information that a password should be entered if an access to ciphered information stored in a file storage means is requested;

determination processing to detect the movement of the data processing apparatus from its usual location; and deciphering password request processing to request, if said instruction information is stored by said setting storage processing at the time of receiving said access request and the movement of the data processing apparatus is detected by said determination processing, the user of the data processing apparatus to enter his or her password and, if the entered password is not found identical with a prescribed password, to refrain from executing said access.

30. A program embodied in electric signals, said program causing a data processing apparatus to perform:

setting storage processing to store first instruction information that an alarm should be issued if the data processing apparatus is moved from its usual location, second instruction information that a password should be entered at the time of turning on power supply to said data processing apparatus, and third instruction information that a password should be entered if an access to ciphered information stored in a file storage means is requested;

determination processing to detect the movement of said data processing apparatus from its usual location;

alarm processing to issue an alarm if the movement of said data processing apparatus is detected by said determination processing and if said first instruction information is stored by said setting storage processing;

power supply password request processing to request, if said second instruction information is stored by said setting storage processing at the time of turning on power supply to said data processing apparatus and the movement of the data processing apparatus is detected by said determination processing, the user of the data processing apparatus to enter his or her password and, if the entered password is not found identical with a prescribed password, to stop the processing to start up the data processing apparatus; and deciphering password request processing to request, if said third instruction information is stored by said setting storage processing at the time of receiving said access request and the movement of said data processing apparatus is detected by said determination processing, the user of the data processing apparatus to enter his or her password and, if the entered password is not found identical with a prescribed password, to refrain from executing said access.

31. A data processing apparatus comprising;

a setting storage means for storing instruction information that an alarm should be issued if said data processing apparatus is moved from its usual location;

a determining means for detecting the movement of said data processing apparatus from its usual location; and an alarming means for issuing an alarm if notified by said determining means of the movement of said data processing apparatus, if said setting storage means stores said instruction information;

wherein said determining means detects with a sensing device the movement of said data processing apparatus from its usual location, said sensing device consists of a plurality of illuminance sensors, each of the sensors measures the illuminance around it, and said determining means determines said data processing apparatus to have been moved from the usual location thereof if variations in illuminance around the sensors as measured by said sensing device are uneven and the illuminance measured by the sensors are smaller than a preset threshold.

32. A data processing apparatus comprising:

a setting storage means for storing instruction information that a password should be entered at the time of turning on power supply to said data processing apparatus;

a determining means for detecting the movement of said data processing apparatus from its usual location; and a power supply password requesting means for requesting, if said instruction information is stored in said setting storage means at the time of turning on power supply to said data processing apparatus and said determining means has detected the movement of the data processing apparatus, the user of the data processing apparatus to enter his or her password and, if the entered password is not found identical with a prescribed password, stopping the processing to start up the data processing apparatus;

wherein said determining means detects with a sensing device the movement of said data processing apparatus from its usual location; and wherein said sensing device consists of a plurality of illuminance sensors, each of the sensors measuring the illuminance around it, said determining means determining said data processing apparatus to have been moved from the usual location thereof if variations in illuminance around the sensors as measured by said sensing device are uneven and the illuminance measured by the sensors are smaller than a preset threshold.

33. A data processing apparatus comprising:

a setting storage means for storing instruction information that a password should be entered if an access to ciphered information stored in a file storage means is requested;

a determining means for detecting the movement of said data processing apparatus from its usual location; and a deciphering password requesting means for requesting, if said instruction information is stored in said setting storage means at the time of receiving said access request and said determining means has detected the movement of said data processing apparatus, the user of the data processing apparatus to enter his or her password and, if the entered password is not found identical with a prescribed password, refraining from executing said access;

wherein said determining means detects with a sensing device the movement of said data processing apparatus from its usual location; and wherein said sensing device consists of a plurality of illuminance sensors, each of the sensors measuring the illuminance around it, said determining means determining said data processing apparatus to have been moved from the usual location thereof if variations in illuminance around the sensors as measured by said sensing device are uneven and the illuminance measured by the sensors are smaller than a preset threshold.

34. A data processing apparatus comprising:

a setting storage means for storing first instruction information that an alarm should be issued if said data processing apparatus is moved from its usual location, second instruction information that a password should be entered at the time of turning on power supply to said data processing apparatus, and third instruction information that a password should be entered if an access to ciphered information stored in a file storage means is requested;

a determining means for detecting the movement of said data processing apparatus from its usual location;

an alarming means for issuing an alarm if notified by said determining means of the movement of said data processing apparatus, if said setting storage means stores said first instruction information;

a power supply password requesting means for requesting, if said second instruction information is stored in said setting storage means at the time of turning on power supply to said data processing apparatus and said determining means has detected the movement of the data processing apparatus, the user of the data processing apparatus to enter his or her password and, if the entered password is not found identical with a prescribed password, stopping the processing to start up the data processing apparatus; and a deciphering password requesting means for requesting, if said third instruction information is stored in said setting storage means at the time of receiving said access request and said determining means has detected the movement of said data processing apparatus, the user of the data processing apparatus to enter his or her password and, if the entered password is not found identical with a prescribed password, refraining from executing said access;

wherein said determining means detects with a sensing device the movement of said data processing apparatus from its usual location; and wherein said sensing device consists of a plurality of illuminance sensors, each of the sensors measuring the illuminance around it, said determining means determining said data processing apparatus to have been moved from the usual location thereof if variations in illuminance around the sensors as measured by said sensing device are uneven and the illuminance measured by the sensors are smaller than a preset threshold.

* * * * *